Aug. 29, 1939.　　　W. MAHNKEN　　　2,171,129
TUNING INDICATOR FOR RADIO RECEIVERS
Filed Aug. 11, 1938　　　3 Sheets-Sheet 1

INVENTOR
WERNER MAHNKEN
BY
ATTORNEY

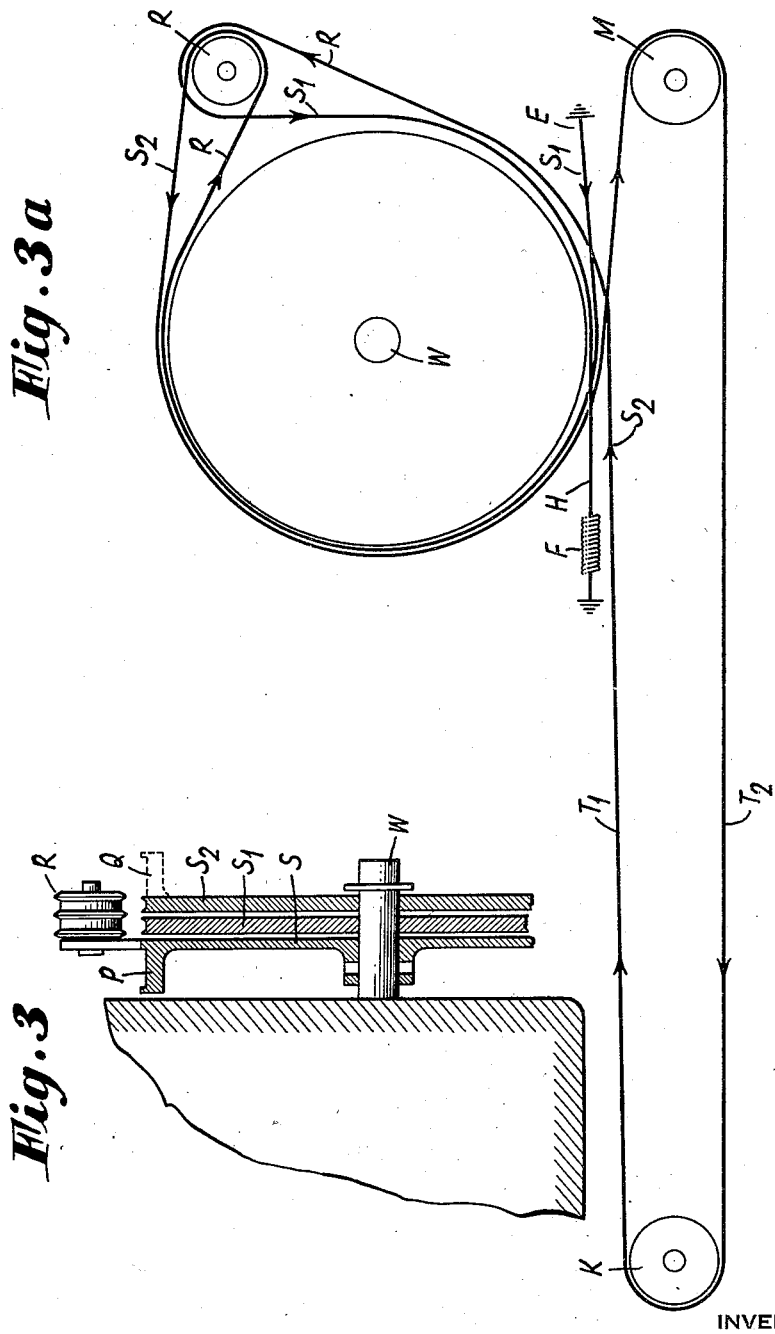

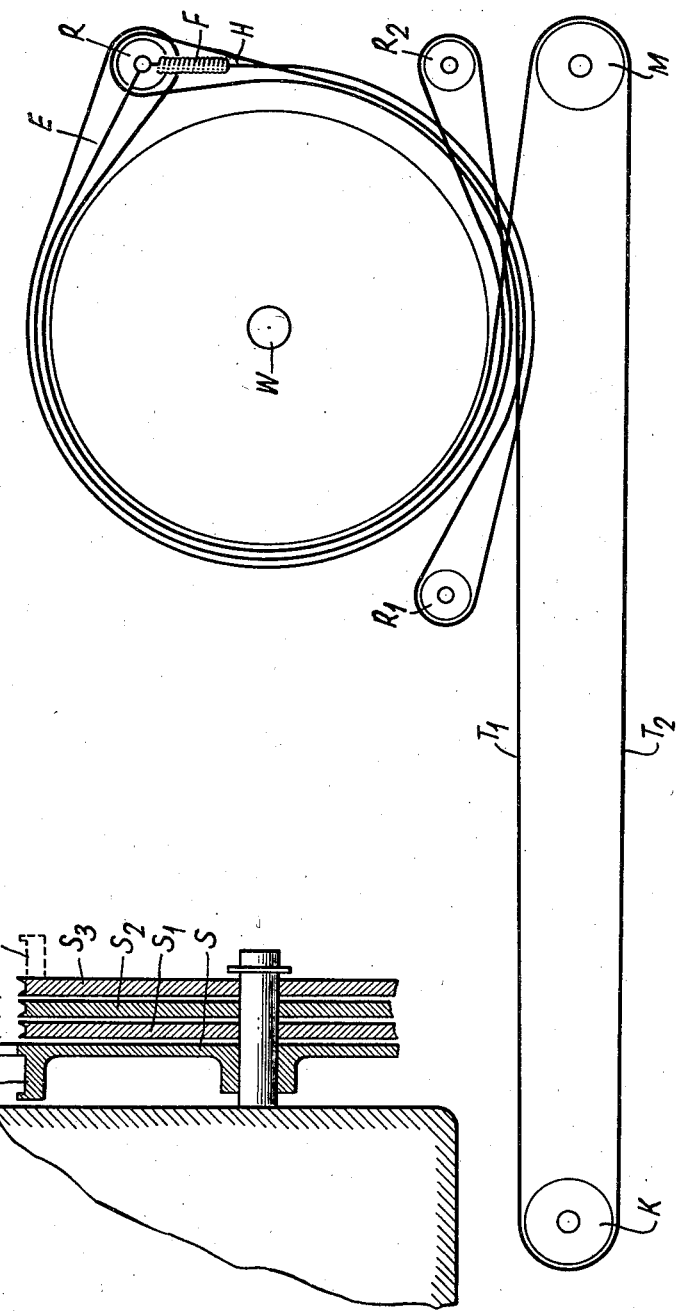

Patented Aug. 29, 1939

2,171,129

UNITED STATES PATENT OFFICE 2,171,129

TUNING INDICATOR FOR RADIO RECEIVERS

Werner Mahnken, Blankenfelde, Germany, assignor to Telefunken Gesellschaft für Drahtlose Telegraphie m. b. H., Berlin, Germany, a corporation of Germany Application August 11, 1938, Serial No. 224,278
In Germany August 25, 1937

6 Claims. (Cl. 116—124.1)

In the operation and use of dials or indicator scales of receiver apparatus comprising a cable or cord carrying the pointer and coupled with the shaft of the tuning means such as a rotary condenser, one well known problem is to double the distance of the pointer or dial hand without an increase in size of the pulley seated upon the condenser shaft. One means known in the prior art adapted to this end operates in this manner that the cable which runs on a pulley seated upon the condenser shaft and a second pulley or roll, does not itself carry the indicator hand, but causes rectilinear shift of a slide or carriage. The latter is fitted with a roller at each end, these rollers being connected by a cord or cable drive closed upon itself. If this second cable is held at some point in space, the result is that the opposite parts of the cable at which the indicator hand is attached move with doubled speed when the carriage is moved, in other words, they cover twice the distance for the same range of rotation of the condenser.

The same problem according to the present invention is solved in a substantially simpler manner by disposing the mobile roller of a pulley block covering the smallest distance eccentrically on an arm or a disk secured upon the shaft of the tuning means, while the parts of the cable leading to this roller are guided in contiguity upon a joint disk or upon several disks separately seated upon the shaft of the tuning device, the indicator hand being attached to the part of the cable traveling at accelerated speed.

The advantage inherent in the invention is that a second cable or cord drive is dispensable and that the carriage being more complicated from a technical angle and also more expensive is dispensed with. Another advantage is that inaccuracies in the size of the pulleys and rollers and other parts which are inevitable in large-scale production affect the pointer position less strongly.

For a clearer understanding of the invention, reference will hereinafter be made to the accompanying drawings wherein Fig. 1 discloses one embodiment of the invention. Fig. 2 discloses a modification of the arrangement shown in Fig. 1. Figs. 3a and 4a disclose further modifications and improved forms of the invention, and Figs. 3 and 4 disclose the respective disk or wheel mountings employed in the modifications of Figs. 3a and 4a.

Figure 1:
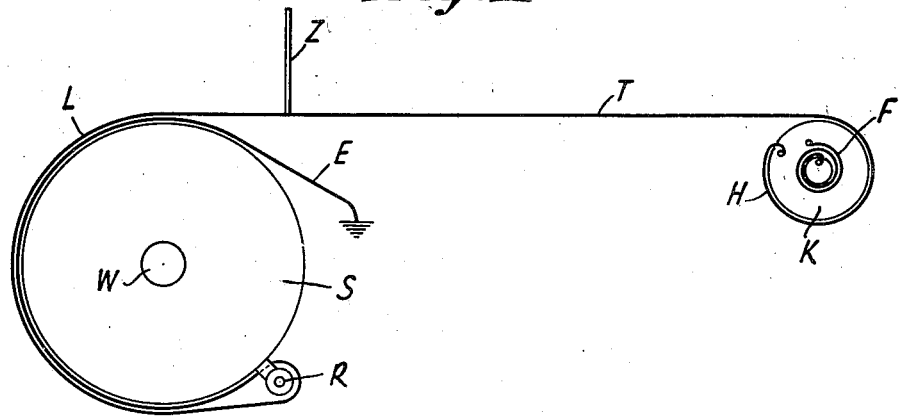
Figure 2:
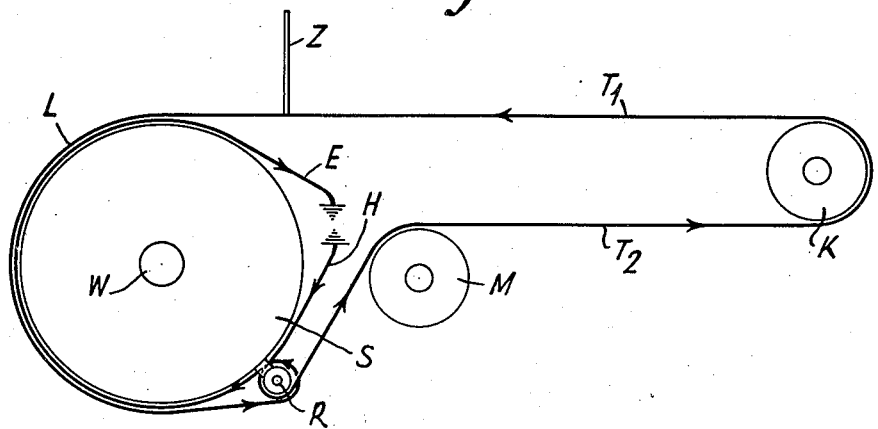

Referring now to Fig. 1 W is the spindle or shaft of the rotary condenser (not shown) and secured thereon is the disk S.

At a certain point of its circumference, disk S carries a roller R. A cable or cord L has its end E attached to a fixed point on the receiver box or casing, and is brought to the roller R through a slot in the periphery of the cord disk or pulley. The cord is placed around the roller R and brought back by way of the same slot. The other end H of the cord is attached to the pulley or roller K which by action of the torsion spring F is subject to a steady torque or pull in clockwise direction so that the cable or cord L is always tautened. The indicator hand Z is fastened at some suitable point to the straight portion T of the cord.

Now, as the rotary condenser shaft W is revolved (which is in fixed connection with the pulley S and the roller R), the speed of the part of the cable or cord located between the roller R and the roller K is twice as great as the circumferential speed of the cable, whereas the portion of the pulley between the roller R and the end E is stationary. Hence, both parts of the cord slip inside the groove of the pulley. The distance covered by the pointer Z is twice as great as what it would be if the cord L were firmly slung around the pulley S as is usually the case.

Upon the circumference of the pulley there are preferably provided two distinct slots or grooves, one thereof being designed to accommodate the fixed or stationary part, while the other one receives the portion of the cord or cable traveling at doubled speed. The roller R could also be replaced by a pin, peg, or the like.

The necessity of providing the torsion spring F may be obviated by guiding the portion of the cord which upon clockwise rotation of the condenser shaft becomes free (and which in the embodiment in Fig. 1 is wound upon the roller K), in the embodiment Fig. 2, over the pulley S to the roller R and thence back to a fixed point. But the ends E and H must be brought to the roller R in opposite directions of rotation. Roller K as well as a further roller M serve in this mechanism solely to idle or guide the cord as far as the pulley S. In this form of construction the indicator hand may be attached to part T1 or else at part T2 of the cord.

Now, embodiments Figs. 1 and 2 still involve the demerit that the cord slides on the pulley S which is in fixed connection with the rotary condenser. This drawback may be overcome by providing on the condenser spindle W three disks or pulleys. Of these, pulley S is fixedly seated upon the condenser shaft and carries the roller R, while disk S1 is loosely seated upon the condenser shaft and serves to guide the fixed parts of the cord. Finally, pulley S2 which is also revoluble upon the condenser shaft serves to guide the portions of the cord L which travels at doubled speed. The way the cord or drive cable is run is schematically shown in Fig. 3a where the reference letters S1 and S2, respectively legending the arrows indicate upon which of the pulleys S1 and S2 the portion of the cord in the indicated direction is laid.

The end H of the cord is connected with a fixed point by way of a tension spring F designed to tauten the cord. The roller or pulley R which is here shown of the twin type, of course, could be attached to an arm or lever fixedly united with the condenser shaft W rather than to the pulley S, so that the pulley S would be superfluous and unnecessary. However, in the present instance the said pulley S could be utilized for driving in this manner that over its periphery P the drive cord is passed which is connected with the tuning or setting knob. If desired, by way of another groove Q indicated by the broken lines in Fig. 3, another cord drive could be disposed on the pulley S2 revolving at doubled speed of rotation, the said cord drive being united with a further setting knob and insuring, for instance, sharp setting and tuning.

It is also possible to use the cord L in this way simultaneously for the drive of the rotary condenser, that it is simply brought to the setting shaft and is slung around the latter or about a pulley seated thereon.

By multiple use of the basic idea underlying the present invention, it would also be feasible to triple or quadruple rather than double the stroke of the indicator hand or pointer. In an arrangement as shown in Figs. 4 and 4a, for instance, the stroke or distance covered by the pointer is tripled. In this arrangement the ends E and H of the cord which, in the arrangements of Figs. 2 and 3 had been chosen at a fixed point are in turn fixedly united with the spindle of the pulley R. Moreover, in the neighborhood of the circumference of the pulley S two stationary pulleys R1 and R2 are mounted.

In this embodiment certain parts of the cord travel at the same rate of rotation as the condenser shaft, certain other parts at the same speed, but in opposite direction, while, finally, still other parts travel in the same sense, but at tripled rate of speed. For guiding these different parts there are seated upon the condenser shaft three pulleys S1, S2, S3, revoluble thereon. Inasmuch as of these three pulleys, one rotates at the same speed as the condenser shaft, it may be fixedly seated upon the condenser shaft or else may, if desired, be united to form one pulley S.

In order to preclude stretching of the cord or cable and thereby undesired shifting of the pointer, the same is preferably made of steel. Still, it would in such case be necessary to make of steel only one-half of the cord which extends from a fixed point to the pointer, in an arrangement as shown in Fig. 3, whereas the other half, that is to say, the half in which the tensioning spring F is inserted, may consist of cord.

What I claim is:

1. In a radio receiver, means for driving the tuning mechanism thereof and for providing an indication of its adjustment, comprising a disk movable with the tuning mechanism, cord-guiding means carried by said disk adjacent its periphery, a driving cord having a portion thereof doubled back upon itself and entrained on said disk, the looped portion of said cord engaging said cord-guiding means, and said driving cord having a rectilinear portion which carries an indicator pointer.

2. In a radio receiver, means for driving the tuning mechanism thereof and for providing an indication of its adjustment, comprising a disk movable with the tuning mechanism, a pulley positioned adjacent the disk periphery and also movable with the tuning mechanism, a driving cord having a portion thereof doubled back upon itself and which is entrained on said disk, the looped portion of said cord engaging said pulley, and said driving cord having a rectilinear portion which carries an indicator pointer.

3. In a radio receiver, means for driving the tuning mechanism thereof and for providing an indication of its adjustment, comprising a disk movable with the tuning mechanism, a pulley carried by said disk adjacent its periphery, one or more pulleys spaced from said disk, a driving cord entrained around said disk and pulleys in a manner such that there is provided a linear portion of the cord between the disk and one of the last mentioned pulleys, and another cord portion which engages the disk periphery for a substantial distance, then the pulley carried by the disk, and then looped back on the first portion which engages the disk periphery to a fixed point.

4. In a radio receiver, driving and indicating means according to claim 3, wherein the opposite end of the cord is also anchored to a fixed point, then engages the pulley carried by the disk, and then joins with the linear portion of the cord at the end opposite to that end which engages the disk periphery.

5. In a radio receiver, means for driving the tuning mechanism thereof and for translating an indication of its angular adjustment upon a rectilinear scale, comprising a disk movable with the tuning mechanism, a pulley carried by said disk adjacent its periphery, one or more pulleys spaced from the disk, and a driving cord entrained around said disk and pulleys in a manner such that a portion of said cord which is provided with an indicator pointer moves rectilinearly, and a further portion of said cord which is doubled back upon itself on the periphery of the disk, the looped portion being in engagement with the pulley which is carried on the disk periphery.

6. In a radio receiver, means for driving the tuning mechanism thereof and for translating an indication of its angular adjustment upon a rectilinear scale, comprising a disk movable with the shaft of the tuning mechanism, a plurality of additional disks loosely mounted on said shaft, a pulley carried by said movable disk adjacent its periphery, a plurality of pulleys spaced from the tuning shaft disks, and a driving cord entrained around the several disks and pulleys in a manner such that a rectilinear portion which is provided with an indicator pointer is entrained around a pair of said pulleys, the remaining portion comprising a pair of looped portions, each engaging the disk movable with the tuning mechanism, the loop of each such portion engaging with the pulley carried by the movable disk.

WERNER MAHNKEN.